United States Patent [19]
Kahle et al.

[11] Patent Number: 5,802,386
[45] Date of Patent: Sep. 1, 1998

[54] LATENCY-BASED SCHEDULING OF INSTRUCTIONS IN A SUPERSCALAR PROCESSOR

[75] Inventors: James A. Kahle; Soummya Mallick; Robert G. McDonald, all of Austin, Tex.

[73] Assignee: International Business Machines Corporation, Armonk, N.Y.

[21] Appl. No.: 751,347

[22] Filed: Nov. 19, 1996

[51] Int. Cl.[6] .................................................. G06F 9/34
[52] U.S. Cl. ...................... 395/800.23; 395/393; 395/391
[58] Field of Search ........................ 395/800.23, 800.24, 395/393, 394, 391

[56] References Cited

U.S. PATENT DOCUMENTS

| | | | |
|---|---|---|---|
| 5,287,466 | 2/1994 | Kodama | 395/393 |
| 5,371,684 | 12/1994 | Iadonato et al. | 364/491 |
| 5,404,470 | 4/1995 | Miyake | 395/375 |
| 5,416,913 | 5/1995 | Grochowski et al. | 395/375 |
| 5,475,824 | 12/1995 | Grochowski et al. | 395/375 |
| 5,497,499 | 3/1996 | Garg et al. | 395/800 |
| 5,519,891 | 5/1996 | Sager et al. | 395/412 |
| 5,560,028 | 9/1996 | Sachs et al. | 395/800.23 |
| 5,615,385 | 3/1997 | Fetterman et al. | 395/800.23 |
| 5,619,668 | 4/1997 | Zaidi | 395/376 |
| 5,625,789 | 4/1997 | Hesson | 395/393 |
| 5,634,026 | 5/1997 | Heaslip et al. | 395/393 |
| 5,636,353 | 6/1997 | Ikenaga et al. | |
| 5,638,526 | 6/1997 | Nakada | 395/394 |
| 5,640,588 | 6/1997 | Vegesna et al. | 395/800.23 |
| 5,692,170 | 11/1997 | Isaman | 395/591 |
| 5,699,537 | 12/1997 | Sharangpani et al. | 395/393 |

*Primary Examiner*—Larry D. Donaghue
*Attorney, Agent, or Firm*—Casimer K. Salys; Daniel E. Venglarik; Andrew J. Dillon

[57] ABSTRACT

Instructions are efficiently scheduled for execution based on a stored identification of the first processor cycle when a result of a previous instruction required as an operand for the instruction to be scheduled will become available. Examination of stored processor cycle identifications for the operands of an instruction reveals the earliest processor cycle when the instruction may be executed. By selecting the greater of the largest stored processor cycle identification for an operand of the instruction and the earliest available processor cycle for an execution unit required to execute the instruction, the instruction is efficiently scheduled for the earliest possible execution. Latency of previous instructions in generating an operand of the instruction being scheduled is automatically accommodated.

20 Claims, 3 Drawing Sheets

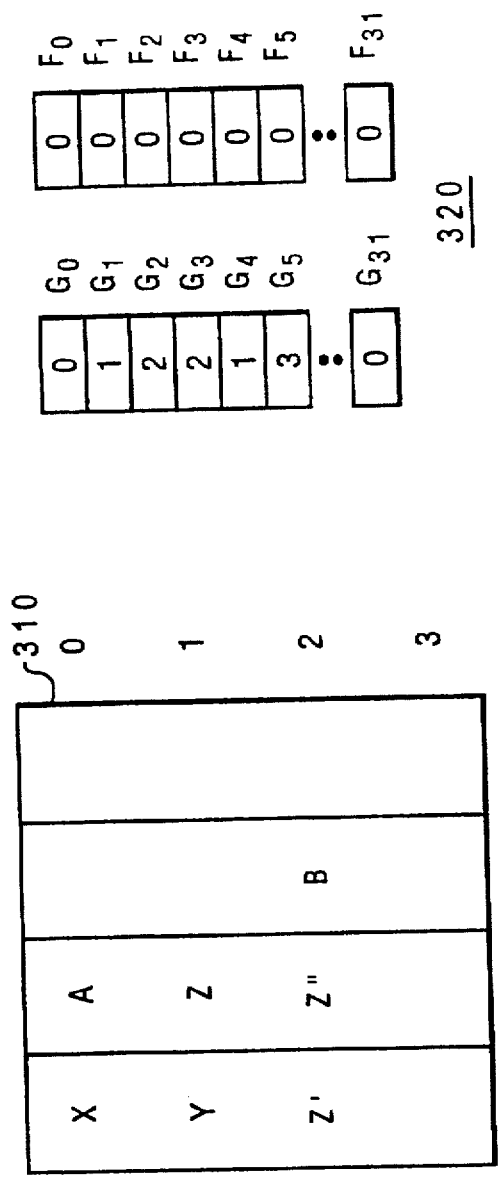
Fig. 3C
Fig. 3B
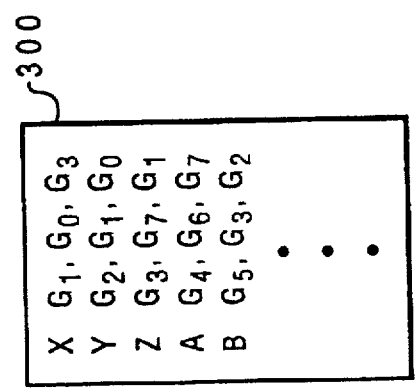
Fig. 3A

LATENCY-BASED SCHEDULING OF INSTRUCTIONS IN A SUPERSCALAR PROCESSOR

BACKGROUND

1. Technical Field

This patent application relates in general to scheduling instructions in a superscalar processor and in particular to efficiently scheduling instructions based on register dependence. Still more particularly, this patent application relates to efficiently scheduling instruction execution in a superscalar processor based on register dependence and latency.

2. Description of the Related Art

Superscalar processors allow parallel execution of multiple instructions during a single processor cycle. When more than one instruction is dispatched for execution in a cycle, however, register dependence may preclude execution of all dispatched instructions during that processor cycle. For example, the first instruction may place its result in a specific register, with that result (i.e., that register) being used as an operand in a subsequent instruction. Therefore, the subsequent instruction cannot be executed during the same processor cycle as the first instruction since a necessary operand will not become available until execution of the first instruction is complete. Moreover, subsequent instructions in an instruction set may reuse the same registers, creating an additional problem for parallel or out-of-order execution of instructions.

Parallel execution dependence checking requires comparisons of each simultaneously dispatched instructions' operand registers with "previous" instruction's target registers. The number of comparisons required for register dependence checking is a direct function of the number of instructions being dispatched for execution in a given cycle. If the number of outstanding or previously dispatched instructions is zero, for example, dispatching the first instruction requires zero comparisons. Dispatching the second instruction requires two comparison, one for each operand against the target of the first instruction. Dispatching the third instruction requires four comparisons: each operand against the targets of the first and second instruction. This can be generalized for N instructions dispatched in one cycle, which will require $$\sum_{i=1}^{N} 2(i-1) = N^2 - N \qquad (1)$$

comparisons.

Previous technologies for dispatching instructions for parallel execution have entailed dispatching instructions to parallel execution pipelines, checking for register dependence, and freezing execution pipelines which contain instructions dependent upon the results of other instructions being executed. A block diagram of the logical processor units involved in this process are depicted in FIG. 1. The blocks represent logical functions performed within the processor and not necessarily discrete circuitry.

In prior art parallel execution, instructions are fetched to an instruction cache 100 by a fetch unit (not shown). The order in which the instructions are stored within the processor's instruction cache 100 results directly from the assembler (not shown), which created and ordered the instructions in executable form. Since executable instructions are generally assembled without regard to whether the program will be executed by a processor having single or multiple execution pipelines, instructions in the processor's instruction cache will usually be ordered for sequential execution.

Instructions from the processor's instruction cache are passed to the decode unit 110, which ascertains the nature of the instruction and the operand and target registers. From decode unit 110, instructions are forwarded to a rename unit 120. Rename unit 120 eliminates register dependence, where possible, by renaming the operand or target registers of instructions independently reusing the same register as previous instructions which might otherwise be executed in parallel. Rename unit 120 has access to a register dependence map 122 of the instructions for this purpose.

From rename unit 120, instructions are passed to dispatch unit 130, where the instructions are held in a first-in, first-out (FIFO) pool to await execution. Dispatch unit 130 in the depicted example is a dispatch unit for only one execution pipeline. In prior art processors, a selection unit 140 provides the necessary register dependence checking to determine if the next instruction may be executed in parallel with instructions in other execution pipelines. In a simplest prior art embodiment, selection unit 140 only looks at the next (or oldest) instruction in the FIFO pool. If execution of the next instruction requires completion of instructions in other execution pipelines, selection unit 140 freezes the subject execution pipeline until such time as the next instruction may be properly forwarded to the pipeline's execution unit 150. Execution unit 150 provides feedback to dispatch unit 130 so that the pool of instructions to be executed may be updated.

In another prior art embodiment, selection unit 140 has the ability to check multiple instructions in the dispatch pool for register dependence with other execution pipelines, pulling instructions out of order to dispatch to the execution pipeline. Selection unit 140 may simultaneously check several instructions in the dispatch pool, dispatching the oldest instruction which does not have register dependence limitations. Additional logic is required to perform the dependence checking and instruction selection prior to the other work that must be performed during instruction dispatch. This additional logic can lead to longer clock cycles or an extra clock cycle of latency, reducing the performance and efficiency of the processor.

The simplest prior art method of scheduling instructions often results in one of several parallel execution pipelines being frozen or delayed while another execution pipeline completes computation of an operand for the instruction in the frozen pipeline. This defeats the purpose of parallel execution pipelines and provides limited benefits over sequential execution. Other prior art methods of scheduling instructions often require additional logic in a critical portion of the processor. It would be desirable, therefore, to be able to efficiently schedule instructions for execution in parallel execution pipelines in a manner which accounts for register dependencies and execution latencies.

SUMMARY

It is therefore one object to provide a method for scheduling instructions in a superscalar processor.

It is another object to provide a method for efficiently scheduling instructions in a superscalar processor based on register dependence.

It is yet another object to provide a method for efficiently scheduling instructions for execution in a superscalar processor based on both register dependence and latency.

The foregoing objects are achieved as is now described. Instructions are efficiently scheduled instructions for execution by a processor by identifying the first available processor cycle in which an operand of the instruction being scheduled will become available. The instruction is scheduled for execution during that first available processor cycle and a processor cycle identification is stored for a processor cycle when the result of the instruction should be available. The instruction is thus efficiently scheduled for execution by a processor based on register dependency and instruction latency.

The above as well as additional objects, features, and advantages of the present invention will become apparent in the following detailed written description.

BRIEF DESCRIPTION OF THE DRAWINGS

The illustrative embodiment and objects and advantages thereof will best be understood by reference to the following detailed description when read in conjunction with the accompanying drawings, wherein:

FIGS. 3A through 3C depict a code sequence and the data structures used to efficiently schedule instructions from the code sequence in accordance with the illustrative embodiment.

DETAILED DESCRIPTION OF THE PREFERRED EMBODIMENT

Figure 2:
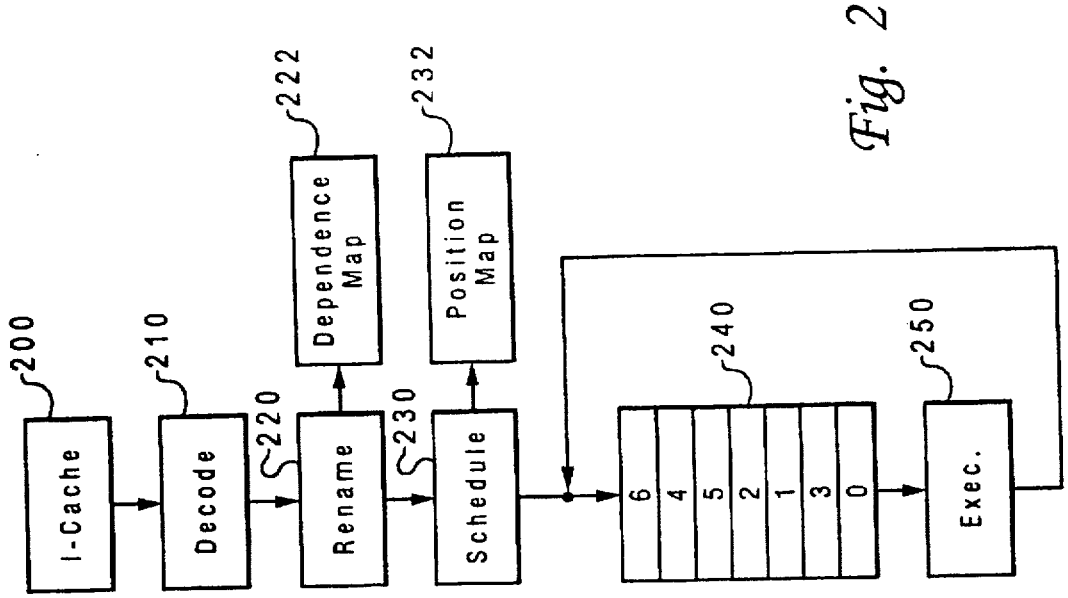
FIG. 2 is a block diagram of logical processor units involved in scheduling instructions for execution in accordance with the illustrative embodiment.
Figure 1:
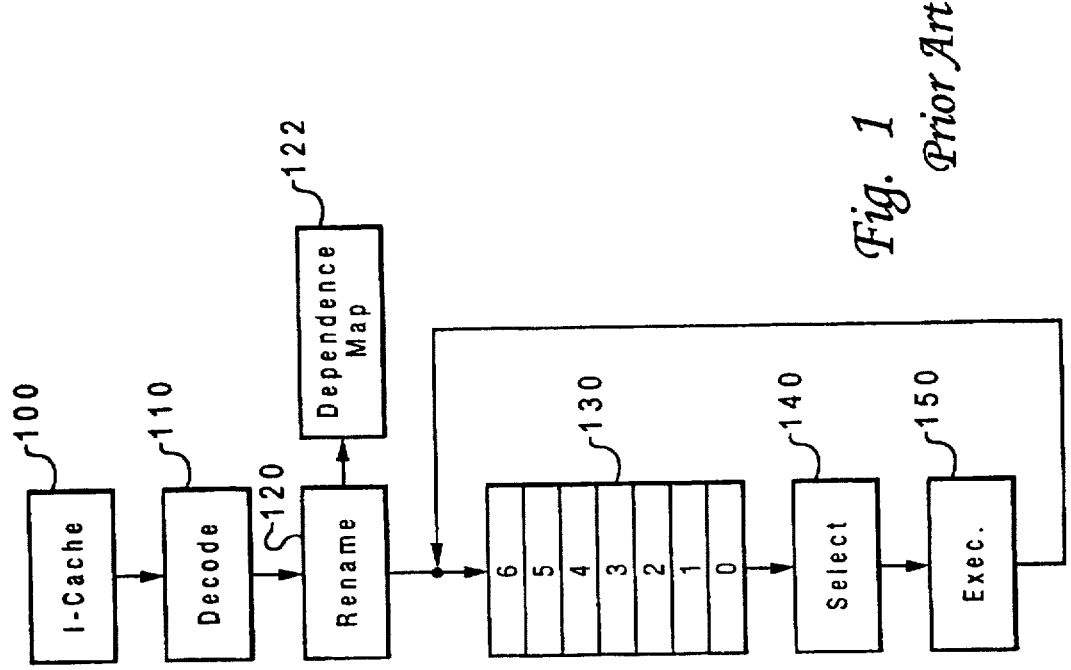
FIG. 1 depicts a block diagram of logical processor units involved in scheduling instructions for execution in accordance with the prior art.

With reference now to the figures, and in particular with reference to FIG. 2, a block diagram of logical processor units involved in scheduling instructions for execution in accordance with a preferred embodiment of the present invention is illustrated. Instructions are fetched to the processor's instruction cache 200 by a fetch unit (not shown). As with the prior art, the order of the instructions in instruction cache 200 is determined by the assembler (not shown). Also similar to the prior art, instructions are passed from the instruction cache 200 to a decode unit 210, and thence to a rename unit 220 which has access to a register dependency map 222 for the purpose of renaming operand and target registers whenever practicable.

The present invention differs from the prior art in the use of scheduling unit 230 receiving instructions from rename unit 220. Using information from position map 232, scheduling unit 230 reorders the instructions based on register dependency and latency before sending them to dispatch unit 240. Dispatch unit 240 is a FIFO pool of instructions awaiting execution, from which instructions are sent directly to execution unit 250. Execution unit 250 provides feedback to dispatch unit 240 so that the pool of instructions awaiting execution may be updated.

Referring now to FIGS. 3A–C, a code sequence and the data structures employed to efficiently schedule instructions from the code sequence in accordance with a preferred embodiment of the present invention are depicted. Code sequence 300 depicted in FIG. 3A includes instructions and an identification of the target and operand registers for each instruction. For each instruction, the target register (i.e., the register in which the result of the instruction is to be stored) is listed first, followed by the operand (source) registers. Code sequence 300 depicted in FIG. 3A represents instructions stored in a processor's instruction cache for execution.

Two data structures are employed to efficiently schedule the instructions of code sequence 300 in accordance with a preferred embodiment of the present invention: a scheduling window 310 depicted in FIG. 3B and a position map 320 depicted in FIG. 3C. Scheduling window 310 and position map 320 may be maintained in a processor's data cache or any other suitable memory. Scheduling window 310 is an array of instructions, with each column representing instructions scheduled for a particular execution pipeline and each entry in a column representing the instruction scheduled for execution during the corresponding processor cycle. A particular column may, for example, hold instructions scheduled for the floating point execution unit within the processor, or for one of several integer or fixed point execution units within the processor. Instructions are ordered within the column in the sequence in which they will be executed by the corresponding execution pipeline.

Position map 320 contains separate maps for general purpose registers (GPRs) and floating point registers (FPRs) within the processor. In the depicted example of position map 320, registers $G_0$ through $G_{31}$ are general purpose registers while registers $F_0$ through $F_{31}$ are floating point registers. Each entry in position map 320 represents the processor cycle for which the corresponding register is first available for use as an instruction operand (i.e., the first processor cycle after the cycle when any previous instructions for which the register was a target will be complete). Each entry in the position map is initialized to zero, the first processor cycle. The position map is then updated as each instruction is scheduled and is used to determine the earliest processor cycle for which an instruction may be scheduled.

In the depicted example, the operand and target registers for instructions in code sequence 300 are all assumed to be general purpose registers. The first instruction in code sequence 300, X, is automatically scheduled for processor cycle zero. The position map entry for the target register $G_1$ of instruction X is updated with the number of the processor cycle when instruction X will be complete and the result available. Assuming, for the time being, that instruction X and all subsequent instructions require only one processor cycle to complete (such as an "ADD" instruction), processor cycle 1 is identified in the position map entry corresponding to register $G_1$.

The next instruction in code sequence 300, instruction Y, is then examined to determine if register dependence precludes it from being scheduled for execution in parallel with X. Since the content of register $G_1$ is an operand of Y, the instruction is scheduled for execution during processor cycle 1 and processor cycle 2 is identified in the position map entry corresponding to the target register, $G_2$, of instruction Y. Similarly, since Z is found to also require the contents of register $G_1$ as an operand, Z is scheduled for execution during processor cycle 1 and processor cycle 2 is stored in the position map entry corresponding to the target register of Z, $G_3$. Instruction A from code sequence uses as operands the contents of registers whose position map entries still contain 0 (recall that each position map entry was initialized to zero). Therefore instruction A may be scheduled for execution during processor cycle 0, in parallel with instruction X. The position map entry corresponding to the target register of instruction A, $G_4$, is updated with processor cycle 1 as the earliest processor cycle in which the result of A will be available. Instruction B, which requires as an operand the content of register $G_2$, is scheduled for execution during processor cycle 2 and the position map entry corresponding to the target register of B, $G_5$, is updated to reflect processor cycle 3 as the earliest available cycle for dependent instructions.

Several other factors may affect scheduling of instructions. If multiple instructions otherwise capable of parallel execution both require execution by the same execution pipeline, the instructions are scheduled sequentially. For example, assume that instruction Z' occupies the position of instruction Z in the code sequence depicted in FIG. 3A and uses the same target and operand registers as instruction Z. If instructions Y and Z' both require execution by the processor's sole floating point unit, Z' will be scheduled for execution during processor cycle 2 and the corresponding position map entry for target register $G_3$ of instruction Z' revised accordingly.

Instruction latency is another factor affecting instruction scheduling. Suppose instruction Z" now occupies the position of instruction Z in the code sequence depicted in FIG. 3A and, again, uses the same target and operand registers as instruction Z. If instruction X requires two processor cycles to complete (such as a "LOAD" instruction), a subsequent instruction Z" requiring the result of instruction X as an operand will be scheduled for execution during processor cycle 2 and the corresponding position map entry for target register $G_3$ of instruction Z" revised accordingly. Scheduling of subsequent instructions which require the results of instruction Z" must be shifted appropriately to accommodate the latency of instruction X. It should be noted that instruction latency may not always be definitively known, but may be merely predictive. For example, a "LOAD" instruction may require more than two cycles if there is a cache miss. Predicted instruction latencies are generally sufficient for the purposes of scheduling instructions according to the present invention. It is worth noting, however, that processor cycles identified in the position map are merely predictions of the cycle in which the instruction results are expected to be available.

Yet another factor affecting scheduling is the number of available execution pipelines. If each execution pipeline has an instruction scheduled for a given processor cycle, instructions are then scheduled for an appropriate execution pipeline during the next available processor cycle. Thus, although five instructions could be scheduled for parallel execution based on register dependency, the fifth instruction must be delayed for at least one processor cycle if only four execution pipelines are available in the processor.

Figure 4:
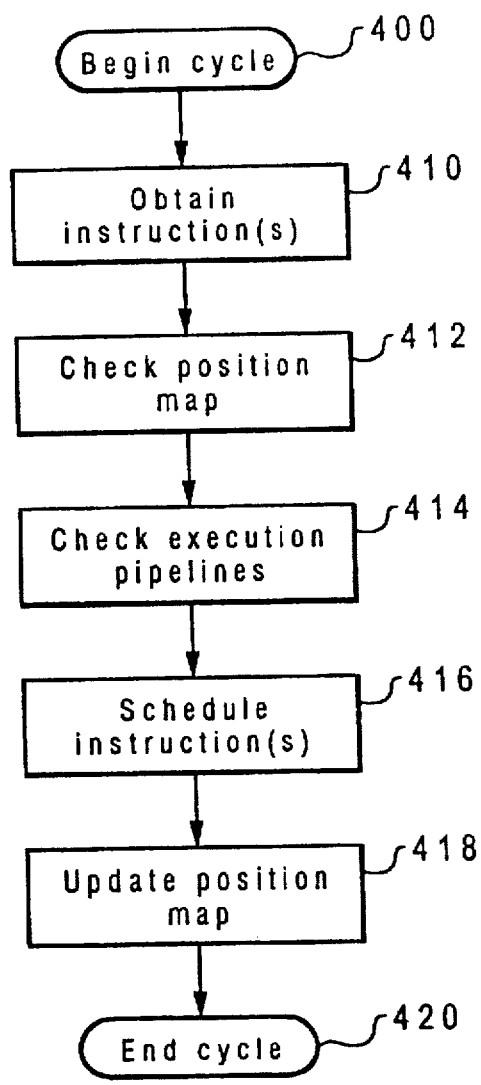
FIG. 4 is a high level flowchart for a process of scheduling instructions in accordance with the illustrative embodiment.

With reference now to FIG. 4, a high level flowchart for a process of scheduling instructions in accordance with a preferred embodiment of the present invention is illustrated. The process begins at step 400, which depicts the beginning of a processor cycle and proceeds to step 410, which illustrates obtaining an instruction or instructions to be scheduled. Multiple instructions may be concurrently scheduled using the method of the present invention provided the accuracy of the position map for each instruction is insured. The process then passes to step 412, which depicts checking the position map entries corresponding to the operand registers of the instruction or instructions being scheduled. The process next proceeds to step 414, which illustrates checking available execution pipelines, and then to step 416, which depicts scheduling the instruction or instructions for execution by one or more specific execution pipelines based on register dependence, instruction latency, pipeline availability, and the nature of the instruction or instructions being scheduled. The process then passes to step 418 which illustrates updating the position map entry corresponding to the target registers of the instruction(s) scheduled. The process then proceeds to step 420, which depicts the end of the processor cycle. The process is repeated during each processor cycle to obtain dynamic scheduling of instructions for efficient execution.

The scheduling method disclosed above may be applied to any number of instructions fetched for execution in parallel. The ordered instructions in the scheduling window data structure may be sent directly to the appropriate execution units. Some instructions, such as "LOAD" and "STORE" instructions, are not amenable to "up front" register dependence checking in accordance with the present invention because the instructions use addresses which must be computed during execution. One of two alternatives may be employed with respect to such instructions: (1) restrict such instructions from reordering so that, for example, a "LOAD" instruction never gets scheduled before a "STORE" instruction on which it depends; or (2) permit reordering but include some mechanism for detecting when the reordering was improper. One manner in which the latter alternative might be implemented is to assign unique identifiers to debatable instructions to determine if reordering violated some dependence.

It is important to note that while the invention has been described in the context of dynamically scheduling operations within a processor, the method of the present invention is applicable in a variety of other contexts. For example, the scheduling window data structure for a given set of instructions may be stored in a cache memory for reuse. Since only approximately 10% of the instructions in a given program consume as much as 90% or more of the processor cycles required to execute the total program, preservation of instruction scheduling results could speed program execution.

While the illustrative embodiment has been particularly shown and described, it will be understood by those skilled in the art that various changes in form and detail may be made therein.

What is claimed is:

1. A method of efficiently scheduling instructions for execution by a processor, comprising:

identifying, utilizing a register dependence and an instruction latency, a first available cycle in which an operand of an instruction is predicted to become available;

scheduling said instruction for execution during said identified first available cycle;

predicting a cycle in which a result of said instruction will be available utilizing a latency of said instruction; and storing a cycle identification for said cycle in which said result of said instruction is predicted be available in a scheduling map position associated with a target register for said result of said instruction, such that said instruction is efficiently scheduled for execution by a processor utilizing register dependence and instruction latency.

2. The method of claim 1 further comprising repeating said scheduling and storing steps for each instruction in a plurality of instructions.

3. The method of claim 1 wherein said step of scheduling an instruction for execution further comprises:

examining a stored cycle identification in a scheduling map position corresponding to a register containing an operand of said instruction; and scheduling said instruction for execution during a cycle corresponding to said stored cycle identification.

4. The method of claim 1 wherein said step of scheduling an instruction for execution further comprises:

comparing a stored cycle identification in a scheduling map position corresponding to a register containing a first operand of said instruction with a stored cycle identification in a scheduling map position corresponding to a register containing a second operand of said instruction; and scheduling said instruction for execution during a cycle corresponding to a largest stored cycle identification.

5. The method of claim 4 wherein said instruction comprises a first instruction, said method further comprising:

scheduling a second instruction for execution during an earliest available cycle in which an operand of said second instruction is predicted to become available; and storing a cycle identification for an earliest cycle in which a result of said second instruction is predicted to be available in a scheduling map position associated with a target register for said result of said second instruction.

6. The method of claim 5 wherein said step of scheduling a second instruction further comprises:

examining a stored cycle identification in a scheduling map position corresponding to a register containing an operand of said second instruction; and scheduling said second instruction for execution during a cycle corresponding to said stored cycle identification.

7. The method of claim 1 wherein said step of scheduling an instruction for execution further comprises:

determining an earliest available cycle for an execution unit required to execute said instruction; and scheduling said instruction for execution during said earliest available cycle.

8. The method of claim 1 wherein said step of storing a processor cycle identification further comprises:

adding a number of cycles required to execute said instruction to a cycle identification for said first available cycle during which said instruction is scheduled to execute; and storing a sum of said addition of said number of cycles with said first available cycle identification as said cycle identification for said cycle in which said result of said instruction is predicted to be available in a scheduling map position associated with a target register for said result of said instruction.

9. An apparatus for efficiently scheduling instructions for execution by a processor, comprising:

identification means for identifying, utilizing a register dependence and an instruction latency, a first available cycle in which an operand of an instruction is predicted to become available;

scheduling means for scheduling said instruction for execution during said identified first available cycle;

prediction means for predicting a cycle in which a result of said instruction will be available utilizing a latency of said instruction; and memory means for storing a cycle identification for said cycle in which said result of said instruction is predicted be available in a scheduling map position associated with a target register for said result of said instruction, such that said instruction is efficiently scheduled for execution by a processor utilizing register dependence and instruction latency.

10. The apparatus of claim 9 wherein said scheduling means further comprises:

examination means for examining a stored cycle identification in a scheduling map position corresponding to a register containing an operand of said instruction; and said scheduling means further comprising means for scheduling said instruction for execution during a cycle corresponding to said stored cycle identification.

11. The method of claim 9 wherein said scheduling means further comprises:

comparing means for comparing a stored cycle identification in a scheduling map position corresponding to a register containing a first operand of said instruction with a stored cycle identification in a scheduling map position corresponding to a register containing a second operand of said instruction; and said scheduling means further comprising means for scheduling said instruction for execution during a cycle corresponding to a largest stored cycle identification.

12. The apparatus of claim 11 wherein said instruction comprises a first instruction, and:

said scheduling means further comprises means for scheduling a second instruction for execution during an earliest available cycle in which an operand of said second instruction is predicted to become available; and said memory means further comprises means for storing a cycle identification for an earliest cycle in which a result of said second instruction is predicted to be available in a scheduling map position associated with a target register for said result of said second instruction.

13. The apparatus of claim 12 wherein said scheduling means further comprises:

examination means for examining a stored cycle identification in a scheduling map position corresponding to a register containing an operand of said second instruction; and said scheduling means further comprising means for scheduling said second instruction for execution during a cycle corresponding to said stored cycle identification.

14. The apparatus of claim 9 wherein said scheduling means further comprises:

means for determining an earliest available cycle for an execution unit required to execute said instruction; and means for scheduling said instruction for execution during said earliest available cycle.

15. The apparatus of claim 9 wherein said memory means further comprises:

adding means for adding a number of cycles required to execute said instruction to a cycle identification for said first available cycle during which said instruction is scheduled to execute; and means for storing a result of said addition of said number of cycles with said first available cycle identification as said cycle identification for said cycle in which said result of said instruction is predicted to be available in a scheduling map position associated with a target register for said result of said instruction.

16. A method of efficiently scheduling instructions in a superscalar processor:

reading a cycle identification within a scheduling map position corresponding to an operand register for an instruction;

scheduling the instruction for execution during a cycle identified by the cycle identification;

adding a latency of the instruction to a cycle identification for a cycle during which the instruction is schedule to execute to predict a cycle in which a result of the instruction will be available; and storing a cycle identification for the predicting cycle in which the result of the instruction will be available in a scheduling map position associated with a target register for the result of the instruction.

17. The method of claim 16, further comprising:

reading a cycle identification within a scheduling map position corresponding to a second operand register for the instruction;

comparing the cycle identification within the scheduling map position corresponding to the operand register to the cycle identification within the scheduling map position corresponding to the second operand register to determine a larger cycle identification;

scheduling the instruction for execution during a cycle identified by the larger cycle identification.

18. The method of claim 16, further comprising:

comparing the cycle identification within the scheduling map position corresponding to the operand register to a cycle identification for a first available cycle for an execution unit for the instruction;

responsive to determining that the cycle identification within the scheduling map position corresponding to the operand register is larger than the cycle identification for the first available cycle for the execution unit, scheduling the instruction for execution during a cycle identified by the cycle identification within the scheduling map position corresponding to the operand register to a cycle identification.

19. The method of claim 18, further comprising:

responsive to determining that the cycle identification within the scheduling map position corresponding to the operand register is smaller than the cycle identification for the first available cycle for the execution unit, scheduling the instruction for execution during a cycle identified by the cycle identification for the first available cycle for the execution unit.

20. The method of claim 16, further comprising:

responsive to determining that the scheduling map position corresponding to the operand register contains a null cycle identification, scheduling the instruction for execution during a first available cycle for the execution unit for the instruction.

* * * * *

UNITED STATES PATENT AND TRADEMARK OFFICE
CERTIFICATE OF CORRRECTION

PATENT NO. : 5,802,386
DATED : September 1, 1998
INVENTOR(S) : Kahle et al.

It is certified that error appears in the above-identified patent and that said Letters Patent is hereby corrected as shown below:

On the title page add the following to item [56]

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 4 | 3 | 0 | 8 | 5 | 1 | 07/23/1996 | Hirata et al | | | |
| | | 5 | 5 | 3 | 9 | 9 | 1 | 1 | 07/04/1995 | Nguyen et al | | | |
| | | | | | | | | | | | | | |

Signed and Sealed this

Sixth Day of April, 1999

*Attest:*

*Attesting Officer*

Q. TODD DICKINSON

*Acting Commissioner of Patents and Trademarks*